Oct. 13, 1925.

H. T. HALLOWELL

CLUTCH

Filed Oct. 20, 1919 3 Sheets-Sheet 1

1,557,159

Inventor
Howard T. Hallowell
by his Attorneys
Howson & Howson

Oct. 13, 1925.

H. T. HALLOWELL

CLUTCH

Filed Oct. 20, 1919

Inventor—
Howard T. Hallowell
by his Attorneys
Howson & Howson

Oct. 13, 1925.
H. T. HALLOWELL
CLUTCH
Filed Oct. 20, 1919
1,557,159
3 Sheets-Sheet 3
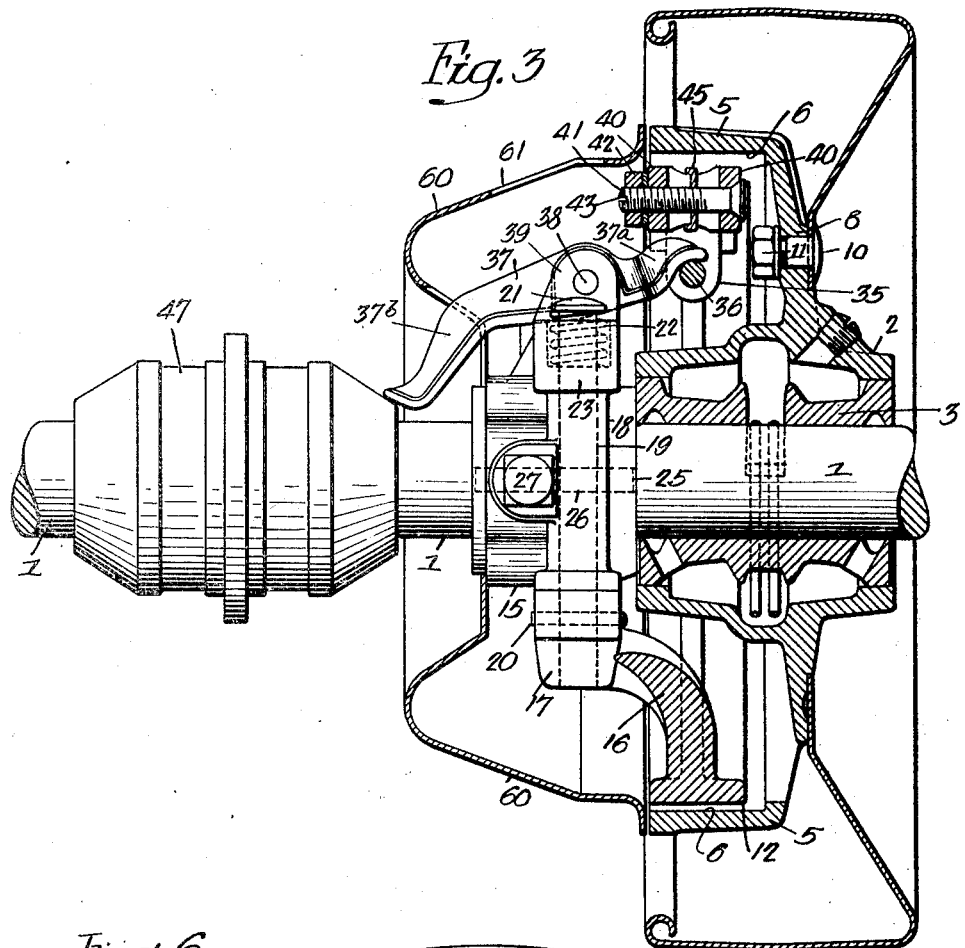
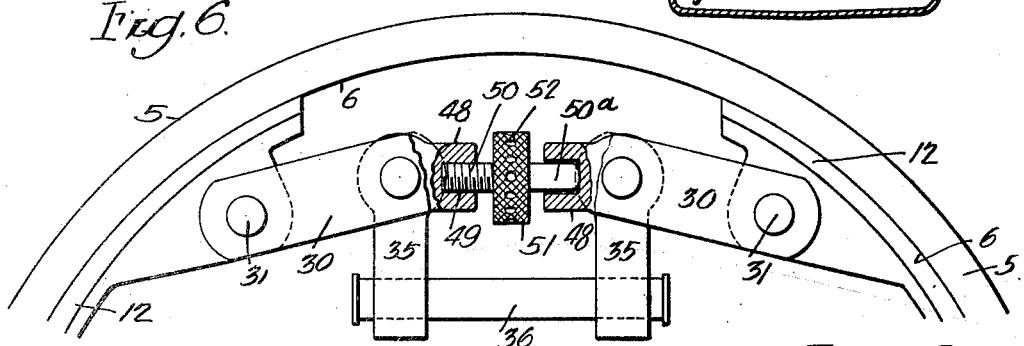
Inventor-
Howard T. Hallowell
by his Attorneys-
Howson & Howson Patented Oct. 13, 1925.

1,557,159

UNITED STATES PATENT OFFICE.

HOWARD T. HALLOWELL, OF PHILADELPHIA, PENNSYLVANIA.

CLUTCH.

Application filed October 20, 1919. Serial No. 331,892.

*To all whom it may concern:*

Be it known that I, HOWARD T. HALLO-WELL, a citizen of the United States, residing in Philadelphia, Pennsylvania, have invented certain Improvements in Clutches, of which the following is a specification.

My invention relates to friction clutches of the type comprising an expansible and contractile ring disposed for engagement with a rim or flange adjacent to and operatively connected with or forming part of a loose pulley or similar structure, which ring is adapted, through suitable means, to be placed in such frictional engagement with the rim, flange or other part of such pulley or other element or structure that the latter will rotate with the shaft to which the expansible and contractile ring is connected.

My invention comprises certain improvements in structures of this character generally, and more particularly certain improvements in the form of clutch disclosed in the patent of Ernest S. Fairbanks, #1,319,465, dated October 21, 1919.

One object of my invention is to simplify the construction and increase the efficiency in clutches of this character.

A further object of my invention is to provide improved means of taking up or compensating for the wear occasioned by the engagement of the split ring with the complemental part of the pulley structure, and a still further object of my invention is to provide a form of adjustable wedging means to accomplish this result.

These and other features of my invention are more fully described hereinafter, reference being had to the accompanying drawings, in which:

Fig. 3, is a view similar to Fig. 2, illustrating the application of my improved clutching means to a pulley structure of a slightly different type.

Fig. 6, is a view similar to Fig. 4, of a modified construction within the scope of my invention.

Figure 1:
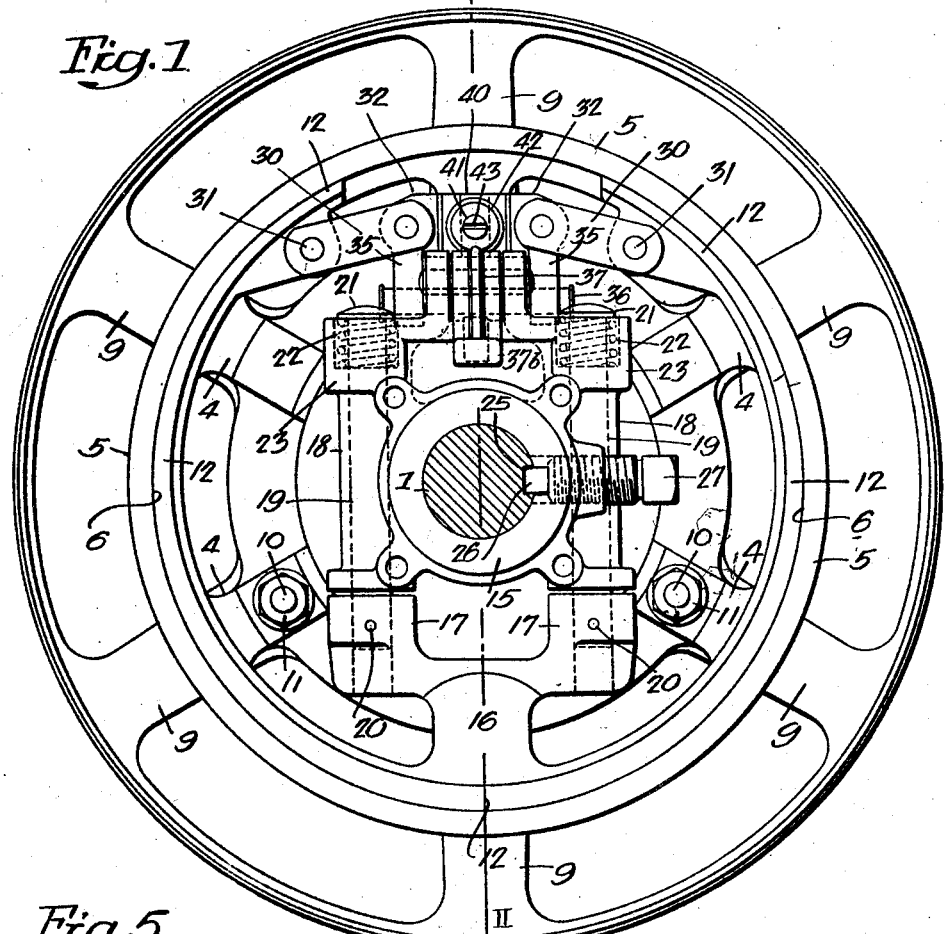
Figure 1, is a front elevation of a clutch structure made in accordance with my invention, showing the application of the same to a pulley structure of the cast metal type.
Figure 5:
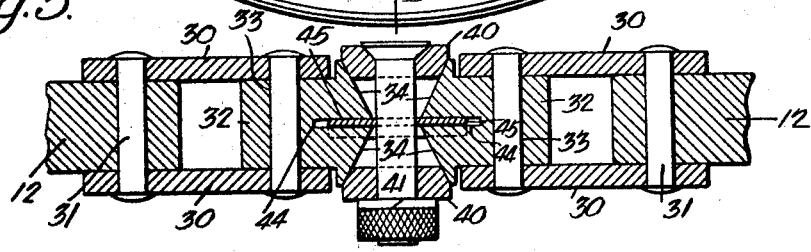
Fig. 5, is a sectional plan view thereof on the line V—V, Fig. 4.
Figure 4:
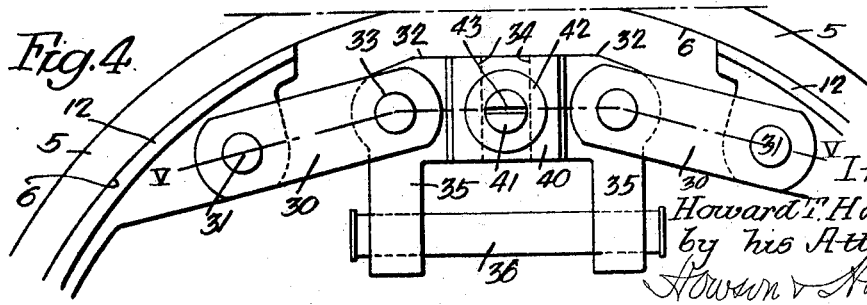
Fig. 4, is an enlarged view of the adjusting means for taking up the wear on the clutch ring.

In the drawings, 1 represents a shaft to which the clutching mechanism, hereinafter described, is keyed, and 2 represents a pulley hub loosely mounted on this shaft, preferably with an interposed bearing 3, which may be of any suitable type. By preference, the pulley is a sectional structure made up of the hub 2 receiving the bearing 3, which hub may be provided with arms 4 forming a spider to which is attached a laterally disposed flange 5 concentric with the shaft and having a true and relatively smooth inner surface 6 forming the engaging face for the clutching member.

The hub may be faced at 7 on the outer side to form a seat receiving the flange 8 of the pulley rim; said flange 8 being connected with the pulley rim by spokes 9, or in any other suitable manner, and being secured to the hub by bolts 10 and nuts 11.

Arranged to engage the inner surface 6 of the flange 5 is a split ring 12, which engages said surface throughout the length of the same when in action, and this split ring is connected to a hub or collar 15 carried by the shaft adjacent the hub of the pulley, by special means hereinafter described.

The lower part of the split ring 12 carries an outwardly projecting arm 16 provided with lateral projections 17 forming a yoked end. The sides of the hub or collar 15 may be provided with bosses or projections 18 receiving stems 19, (vertically disposed in the views of the drawing); said stems being pinned at 20 to the projections 17, and having heads 21 engaging springs 22 disposed in sockets 23 at the upper ends of said side projections 18. This hub 15 is preferably anchored to the shaft by providing the latter with a groove 25, and the hub with a key 26 which may be retained in place by a set screw 27.

The split ring lies normally clear of the flange 5, and in order that it may be expanded into contact therewith, the following means may be employed: To each end of the split ring, a link 30 is pivotally attached, at the point 31 for instance, and the inner ends of these links carry special members 32 comprising a body apertured at 33, and which may have a laterally disposed wedge-shaped portion 34, and a depending perforated ear 35; the perforated ears being disposed in line and supporting a cross pin 36 for engagement by a lever 37, pivoted at 38 to ears 39 carried by the hub 15; the same being operated in the manner hereinafter described whereby said connection may be flexed to spread the split ring.

Disposed on opposite sides of the wedge-shaped portions 34, are wedging members or plates 40, to which a contracting means, which may be in the form of a pin 41, is applied; the latter having a nut 42 at the outer end with a lockwasher interposed between said nut and one of the wedge plates 40. The end of the pin is threaded for engagement with this nut, and also notched at 43 for engagement by a screw driver so that by turning said pin, it will serve to move the wedge plates against the wedge-shaped portions 34 of the members 32 and take up any wear upon the surface of the split ring, or the rim 5.

In order that the members 32 having the wedge-shaped portions 34 may be kept in alignment, I may provide the same with aligned slots 44, and apply to such slots a suitable blade or plate 45, which is apertured for the passage of the pin 41.

Figure 2:
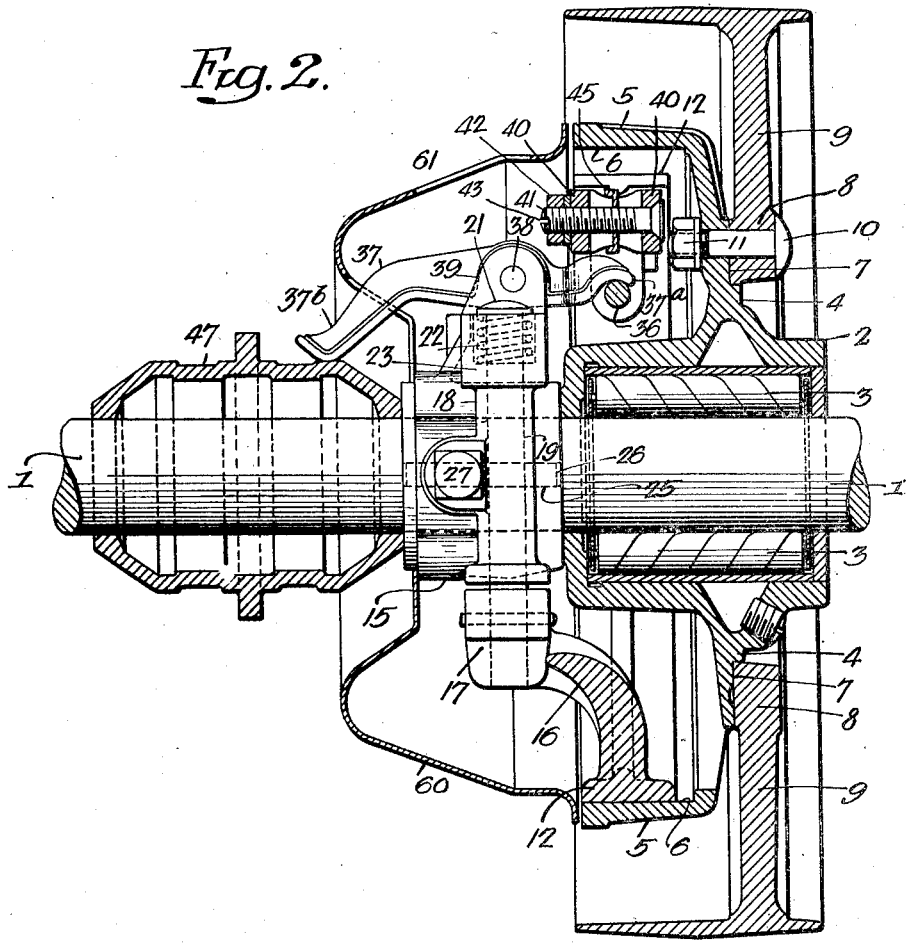
Fig. 2, is a sectional view on the line II—II, Fig. 1.

In order that the connection for the split ring may be flexed to expand the ring against the flange 5, I provide the lever 37, which is pivotally connected to the hub 15. The short end 37$^a$ of this lever is preferably bifurcated, providing two points of engagement with the pin 36. The longer end 37$^b$ is disposed for engagement by a cam-faced clutch spool 47 longitudinally movable on the shaft 1, and when in the position shown in Fig. 2, this spool causes the shorter end 37$^a$ of the lever to react upon the cross pin 36 and move the links 30 to force outwardly the free ends of the split ring so that the latter may engage the clutching face 6 of the flange 5. When this takes place, of course, the whole surface of the split ring is moved into engagement with the flange as well, which has the effect of compressing the springs 22 carried by the hub 15, and the parts assume the position shown in Fig. 1.

When released, the springs 22 react upon the pins or stems 19, connected to the projections 17 and move the split ring away from the flange 5, while the free ends of the same have a natural tendency to contract as soon as the force tending to spread them is relieved.

It will be noted that the pin 36 is sufficiently long to provide for considerable adjustment to take up wear upon the split ring and consequent spreading of the wedge-shaped members 32 to take up such wear before renewal of the parts is necessary.

In Fig. 6, I have shown another form of adjusting means for the ends of the split ring. In this instance the members 32 are provided with socketed projecting portions 48 disposed towards each other. One of these projections may be threaded at 49 for the reception of a threaded stem 50 having an operating portion 51 which may be recessed at 52 for the reception of a suitable tool whereby it may be turned to expand the ends of the split ring when adjustment to take up wear is necessary. As shown in the drawing, the stem 50$^a$ is not threaded, and the threaded portion may be right or left handed as may be desired, since in such arrangement expansion only is desired. In some instances each stem may be threaded; one with a right hand thread and the other with a left hand thread so that when the portion 51 is turned the members 32 may be expanded or drawn towards each other.

Figure 7:
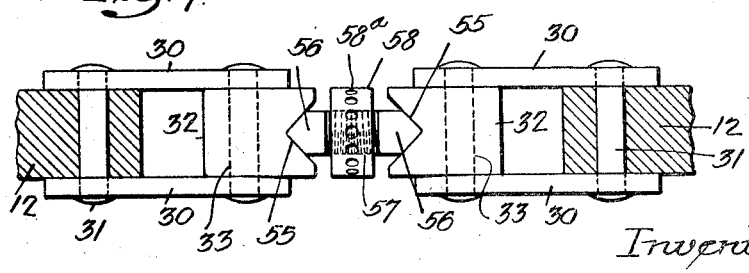
Fig. 7, illustrates another form of adjusting means within the scope of my invention.

In the structure shown in Fig. 7, the members 32 have indented portions 55 to which wedges 56 are adapted; each wedge having a threaded stem 57. One of these stems is provided with a right hand thread, while the other is provided with a left hand thread, and these threads are adapted to similarly threaded portions of a nut 58 centrally disposed and which may have recesses 58$^a$ for the reception of a suitable tool whereby it may be turned to move the wedges 56 outwardly to expand the ends of the split ring.

Preferably the split ring and operating means therefor are enclosed by a suitable housing 60, which may be of sheet metal. This is preferably apertured at 61, for the passage of a screw driver to turn the pin 41 when it is desired to spread the connection for the split ring to take up the wear. This aperture will also provide for the entrance of a suitable tool to operate the form of adjusting devices illustrated in Figs. 6 and 7.

I may employ any form of bearing desired, and in the sectional views showing the clutch in the active and inactive positions, I have illustrated different forms of bearings; the latter, however, forming no part of my invention. In like manner, in lieu of the cast pulley rim or flange shown in Figs. 1 and 2, I may employ a pulley flange of pressed sheet metal, such as shown Fig. 3.

I claim:

1. The combination in a clutch of a split ring; links attached to the ends of the same; lugs carried by the ends of said links; wedging means for spreading said lugs to take up wear of the split ring; a pin loosely connecting said lugs; and means engaging said pin for moving the lugs radially of the ring to spread the links and expand the ring.

2. The combination in a clutch of a split ring; links pivotally connected to the ends of the same; lugs pivotally connected to said links, said lugs having wedge-shaped faces oppositely disposed; a member extending into said lugs for maintaining them in axial alignment; spreading means applied to the wedge-shaped faces of said lugs; and means for adjusting said spreading means to compensate for wear upon the split ring.

3. The combination, in a clutch, of a split ring, links pivotally connected to the ends of the same, lugs pivotally connected to said links; said lugs having wedge-shaped faces oppositely disposed, a liner for maintaining said lugs in axial alignment, wedging members oppositely disposed applied to the wedge-shaped faces of said lugs, and means for adjusting said wedging members to compensate for wear upon the split ring.

4. The combination, in a clutch, of a split ring axially disposed with respect to a shaft, links attached to the ends of said ring, lugs carried by the ends of said links, wedging means for spreading said lugs to take up wear of the split ring; said lugs having depending portions, a pin loosely connecting said depending portions, and means for engaging said pin whereby the lugs may be moved toward the shaft to spread the links and expand the ring.

5. The combination, in a clutch, of a split ring, links pivotally connected to the ends of the same, lugs pivotally connected to said links; said lugs being slotted, a plate adapted to the slots of the lugs for maintaining the same in axial alignment, and means for adjusting said lugs to compensate for wear upon the split ring.

HOWARD T. HALLOWELL.